US006438152B2

United States Patent
Contag et al.

(10) Patent No.: US 6,438,152 B2
(45) Date of Patent: Aug. 20, 2002

(54) LASER AMPLIFICATION SYSTEM

(75) Inventors: Karsten Contag, Stuttgart; Steffen Erhard, Fellbach; Adolf Giesen, Renningen; Martin Karszewski, Bondorf; Christian Stewen, Aichach; Andreas Voss, Schramberg, all of (DE)

(73) Assignee: Universitaet Stuttgart Institut fuer Strahlwerkzeuge, Stuttgart (DE)

( * ) Notice: Subject to any disclaimer, the term of this patent is extended or adjusted under 35 U.S.C. 154(b) by 7 days.

(21) Appl. No.: 09/776,177

(22) Filed: Feb. 2, 2001

Related U.S. Application Data (63) Continuation of application No. PCT/EP99/05128, filed on Jul. 19, 1999.

(30) Foreign Application Priority Data

Aug. 4, 1998 (DE) ......................... 198 35 108

(51) Int. Cl.[7] .............................................. H01S 3/091
(52) U.S. Cl. ....................................................... 372/70
(58) Field of Search ..................................... 372/69, 70

(56) References Cited

U.S. PATENT DOCUMENTS

| | | | | |
|---|---|---|---|---|
| 5,131,002 | A | * 7/1992 | Mooradian | 372/69 |
| 5,148,441 | A | 9/1992 | Itai | 372/70 |
| 2001/0038658 | A1 | * 11/2001 | Contag et al. | 372/70 |
| 2001/0040909 | A1 | * 11/2001 | Erhard et al. | 372/70 |

FOREIGN PATENT DOCUMENTS

| | | |
|---|---|---|
| DE | 40 08 225 | 9/1991 |
| DE | 195 41 020 | 5/1997 |
| DE | 197 28 845 | 1/1999 |
| EP | 0 632 551 | 1/1995 |

OTHER PUBLICATIONS

*Patent Abstracts of Japan*, Abstract of Japanese Patent No. 07079038, "LD Excited Solid–State Laser Device", vol. 1995, No. 6, Mar. 20, 1995.

* cited by examiner

*Primary Examiner*—Leon Scott, Jr.
(74) *Attorney, Agent, or Firm*—Barry R. Lipsitz (57) ABSTRACT

In order to provide a laser amplification system comprising several solid-state volumes having a laser-active medium, a pumping radiation source, a pumping radiation reflector which allows a leg of the pumping radiation field entering the solid-state volume to pass through the solid-state volume again as outgoing leg such that the incoming leg and the outgoing leg form a first pumping branch, a first pumping radiation path, in which the pumping radiation field passes through the first pumping branches in a first sequence, with which the individual solid-state volumes are acted upon with pumping power as uniformly as possible, it is suggested that each solid-state volume be penetrated by a second pumping branch, the incoming leg of which and the outgoing leg of which are located in a second plane different to the first plane, that a second pumping radiation path be provided, in which the pumping radiation field passes through the second pumping branches in a second sequence and that in the second sequence the order of the solid-state volumes be changed in relation to the first sequence.

30 Claims, 6 Drawing Sheets

LASER AMPLIFICATION SYSTEM

This is a continuation of PCT/EP99/05128 filed Jul. 19, 1999.

The invention relates to a laser amplification system comprising several solid-state volumes having a laser-active medium, a pumping radiation source for generating a pumping radiation field for the optical pumping of the laser-active medium, a pumping radiation reflector which is associated with each solid-state volume and allows a leg of the pumping radiation field entering the solid-state volume to pass through the solid-state volume again as an outgoing leg such that the incoming leg and the outgoing leg form an angle with one another located in a plane and thereby form a first pumping branch, a first pumping radiation path through the solid-state volumes, in which the first pumping branches are arranged so as to follow one another such that the pumping radiation field passes through the several solid-state volumes in a first sequence.

Laser amplification systems of this type are known, for example, from EP 0 632 551.

In the case of laser amplification systems with solid-state volumes having a laser-active medium the problem exists that a pumping light excitation of the individual solid-state bodies is brought about with varying pumping power.

The object underlying the invention is therefore to provide a laser amplification system with several solid-state volumes, with which the individual solid-state volumes are acted upon with pumping power as uniformly as possible.

This object is accomplished in accordance with the invention, in a laser amplification system of the type described at the outset, in that each solid-state volume is penetrated by a second pumping branch, the incoming leg of which and the outgoing leg of which are located in a second plane different to the first plane and in this form an angle with one another, that a second pumping radiation path is provided, in which the second pumping branches of the several solid-state volumes are arranged so as to follow one another such that the pumping radiation field passes through the solid-state volumes in a second sequence.

The advantage of the inventive solution is to be seen in the fact that with the second pumping radiation path the possibility is created of pumping each of the solid-state volumes with the same number of pumping branches and, in addition, of introducing the pumping power in the solid-state volumes to be pumped as uniformly as possible on account of the fact that the two pumping branches are located in different planes.

This has the advantage, in particular, with a view to the type of thin, disk-shaped solid-state bodies, which are provided in the inventive solution and are preferably located with a flat side on a cooling surface, that, as a result, the design of as uniform a temperature curve as possible with planes of essentially the same temperature extending parallel to the flat sides of the solid-state bodies is facilitated which is essential for the advantageous working within the scope of the inventive concept.

It is particularly favorable when in the second sequence the order of the solid-state bodies is changed in relation to the first sequence. This solution allows the reduction in intensity in the sequence to be counteracted as a result of the changed order.

With respect to the type of supply to the first and second pumping radiation paths, no further details have so far been given. One advantageous embodiment, for example, provides for each of the pumping light radiation paths to be supplied by its own pumping radiation source, wherein it is preferably provided for the pumping radiation sources to have essentially the same power.

Another alternative embodiment provides for the pumping radiation paths to be supplied by a single pumping radiation source. This has the advantage that—insofar as the radiation power of a single pumping radiation source is sufficient—this can be used for both pumping radiation paths.

In this respect, there are different possibilities for realizing the supply to the two pumping radiation paths with one pumping radiation source.

One possibility is for the pumping radiation field from the pumping radiation source to be divided between the two pumping radiation paths by a beam divider.

This solution has the advantage that, as a result, the possibility exists of supplying both pumping radiation paths with pumping radiation fields of essentially the same intensity.

Another advantageous solution provides for the pumping radiation paths to be coupled to one another by an optical deflection means, i.e. for the pumping radiation field to be coupled in by an optical deflection means with the intensity which is present at the end of one of the pumping radiation paths such that this supplies the next pumping radiation path. This solution is particularly expedient when the intensity absorbed per pumping radiation path is not very large and so following the first pumping radiation path a power of the pumping radiation field is nevertheless available which is sufficiently large to supply the second pumping radiation path.

In principle, it is provided within the scope of the inventive solution for the pumping radiation field to pass through each pumping radiation path in one direction. To improve the pumping of the solid-state bodies it is, however, also advantageous when the pumping radiation field passes through each pumping radiation path in two opposite direction. This is irrespective of whether two pumping radiation sources are provided for supplying the pumping radiation paths or only one pumping radiation source, the power of which can be coupled into the pumping radiation paths in the different ways already described.

A solution, which is particularly simple to realize and with which the pumping radiation field passes through each pumping radiation path twice, provides for a reflector to be arranged at one end of each pumping radiation path and for this to reflect back the pumping radiation field exiting from the pumping radiation path.

In conjunction with the preceding solutions it has merely been specified that the order of the solid-state volumes in the second sequence is intended to be different to that in the first sequence. This may be realized in the most varied of ways, in particular, in a different manner when not only a first sequence and a second sequence are provided but rather several sequences exceeding the first and the second sequences. In the simplest case of a first and a second sequence it is, however, preferably provided for the order of the solid-state volumes in the second sequence to be reversed in relation to the first sequence.

So far, it has been specified in conjunction with the inventive solution that there is a first pumping radiation path and a second pumping radiation path. The inventive solution is, however, not limited to two pumping radiation paths with first and second pumping branches, respectively. On the contrary, it is possible in a further inventive solution for at least one additional pumping radiation path to be provided, with which the pumping radiation field passes through the solid-state bodies in the form of at least one additional sequence. The advantage of this solution is to be seen in the fact that with it an even more uniform excitation of the solid-state bodies can be realized.

This may be realized particularly favorably when the at least one additional sequence runs such that this counteracts varying pumping excitations of the laser-active material in the solid-state volume as a result of the first and the second sequences.

It is, in particular, advantageous when the number of pumping radiation paths is an even number so that the fact that with each pumping radiation path the pumping radiation field pumps from the one pumping branch to the other pumping branch with lower power can be compensated particularly favorably.

With respect to the manner, in which the individual pumping branches of one pumping radiation path are coupled, no particular details have been given. One advantageous embodiment, for example, provides for the individual pumping branches of a pumping radiation path to be coupled by optical refocusing means.

These optical refocusing means may be designed in the most varied of ways. One type of design provides, for example, for the optical refocusing means to image the outgoing leg of a pumping branch directly into the corresponding incoming leg of the next pumping branch.

The advantage of this solution lies in its simplicity. These solutions do, however, have the problem that either the pumping light radiation spot is increased in size or a cross section of the pumping radiation field becomes ever larger from optical refocusing means to optical refocusing means.

For this reason, one inventive solution which is improved in this respect provides for at least one of the optical refocusing means to be designed as an intermediately collimating optical refocusing means and to image the respective outgoing leg via an intermediately collimated leg into the corresponding incoming leg. This solution has the advantage that as a result of the intermediate collimation it is possible to avoid any increase in the size of the cross section of the pumping radiation field.

In this respect, the intermediately collimated legs are preferably designed such that their imaging corresponds to the imaging which is obtained with the sum of the focal distances of the optical means provided on both sides of the intermediately collimated leg. In the case of optical means having the same focal distance on both sides of the intermediately collimated leg, the imaging of the intermediately collimated leg corresponds to one with a double focal distance.

In this respect, it is particularly favorable when all the optical refocusing means are designed as intermediately collimating optical refocusing means so that during the entire course of the respective pumping radiation path no appreciable increase in the size of the cross section of the pumping radiation field is brought about and thus the necessity also does not exist of not imaging part of the radiation field or adapting the optical refocusing means to the increasing size of the cross section of the pumping radiation fields.

One particularly advantageous realization of an intermediately collimating optical refocusing means provides for this to have a folded collimated leg. Such a folded collimated leg creates, in particular, the possibility of designing the optical refocusing means to be space-saving.

Furthermore, a folding of the collimated leg creates the possibility of arranging the legs entering the respective solid-state bodies such that these always enter the solid-state volumes from the same side thereof.

With respect to the design of the intermediately collimating optical refocusing means, no particular details have so far been given. It is, for example, favorable for generating a folded collimated leg when the intermediately collimating optical refocusing means have a deflection element for the folding of the intermediately collimated leg.

To save on components in the case of the intermediately collimating optical refocusing means which require many components, it is preferably provided for one of the intermediately collimating optical refocusing means of the first and one of the intermediately collimating optical refocusing means of the second pumping radiation path to each image the respective, intermediately collimated leg onto a common deflection element so that only one deflection element is required for every two optical refocusing means.

Furthermore, no further details have been given with respect to the design of the intermediately collimating optical refocusing means as a whole. It is, for example, favorably provided for the intermediately collimating optical refocusing means to have a collimating element which images the respectively outgoing leg into the intermediately collimated leg.

Furthermore, it is favorable when the intermediately collimating optical refocusing means have a focusing element which images the intermediately collimated leg into the respectively incoming leg.

With respect to the optical elements which are used in the optical refocusing means, no further details have so far been given.

With respect to the simplicity in construction and spatial requirements, it has proven to be particularly advantageous when the optical refocusing means comprise hollow mirrors, wherein the hollow mirrors serve, in particular, to reshape the outgoing legs of a pumping branch directly into the corresponding incoming legs of the next pumping branch or serve to act as collimating and focusing elements.

In order to obtain particularly good optical images, it is preferably provided for the hollow mirrors to be designed as non-spherical mirrors since with spherical mirrors a not inconsiderable distortion always occurs which deteriorates too greatly the quality of the optical imaging with multiple reshaping of the pumping radiation field.

One embodiment, in particular, in the case of hollow mirrors which reshape an outgoing leg of a pumping branch directly into an incoming leg of the next pumping branch provides for the hollow mirrors to be designed as elliptical mirrors; with the elliptical shape of the mirrors a good quality of the optical imaging can be achieved with adaptation of the shape.

Another alternative embodiment, in particular, one, with which the hollow mirror is intended to represent a collimating or focusing element, provides for the hollow mirror to be designed as a parabolic mirror since a parabolic mirror is always in a position to focus a collimated leg or, vice versa, to collimate a divergent leg.

Not only the use of elliptical mirrors but also the use of parabolic mirrors entails considerable costs since these mirrors are complicated to produce.

For this reason, one advantageous solution provides for the hollow mirrors to be designed as toric mirrors. Toric mirrors of this type can replace not only elliptical mirrors but also parabolic mirrors, wherein the quality of the optical imaging is still sufficiently good, in particular, in the case of long focal distances.

With respect to the arrangement of the solid-state volumes relative to one another, no further details have been given. In principle, the most varied of arrangements of the solid-state volumes relative to one another would be conceivable. The inventive concept may be realized constructionally in a particularly favorable manner when the solid-state volumes are arranged along a line, wherein the line can, in principle, be a curved or a straight line. The individual optical refocusing means may be arranged in a particularly space-saving manner when the solid-state volumes are arranged along a straight line.

Furthermore, it is preferably provided for all the reflection surfaces of the reflectors associated with the solid-state volumes to be located in a common plane. In this case, the first and second pumping branches of the pumping radiation field then extending through the solid-state volumes are located in planes which are at right angles to the common plane of the reflection surfaces of all the reflectors.

In this case, the refocusing elements may preferably be arranged on different sides of a surface extending at right angles to the reflection surfaces and through the line, wherein one pumping branch of the pumping radiation field preferably extends between a refocusing element located on one side of the surface to a refocusing element located on the other side of the surfaces.

With respect to the different planes, in which the first and second pumping branches are intended to be located, no further details have likewise been given so far. One advantageous embodiment, for example, provides for the planes, in which the first and second pumping branches are located, to intersect at an angle of less than or equal to 90°.

With respect to the arrangement of the solid-state volumes, no further details have been given in conjunction with the preceding explanations concerning the individual embodiments. It would, for example, be conceivable, in particular, with a spatially very small design of the inventive solution to provide all the solid-state volumes in one solid-state body. For reasons of the spatial design it is advantageous, in particular, in the case of great power and thus large solid-state volumes when the several solid-state volumes having laser-active medium are arranged in several solid-state bodies, wherein a plurality of solid-state volumes can still be provided in each solid-state body.

It is advantageous, in particular, when achieving great power when each solid-state volume having laser-active medium is arranged in its own solid-state body so that an optimum cooling is brought about in the respective solid-state body, in particular, in the case of great power.

Additional features and advantages of the invention are the subject matter of the following description as well as the drawings illustrating several embodiments.

Figure 1:
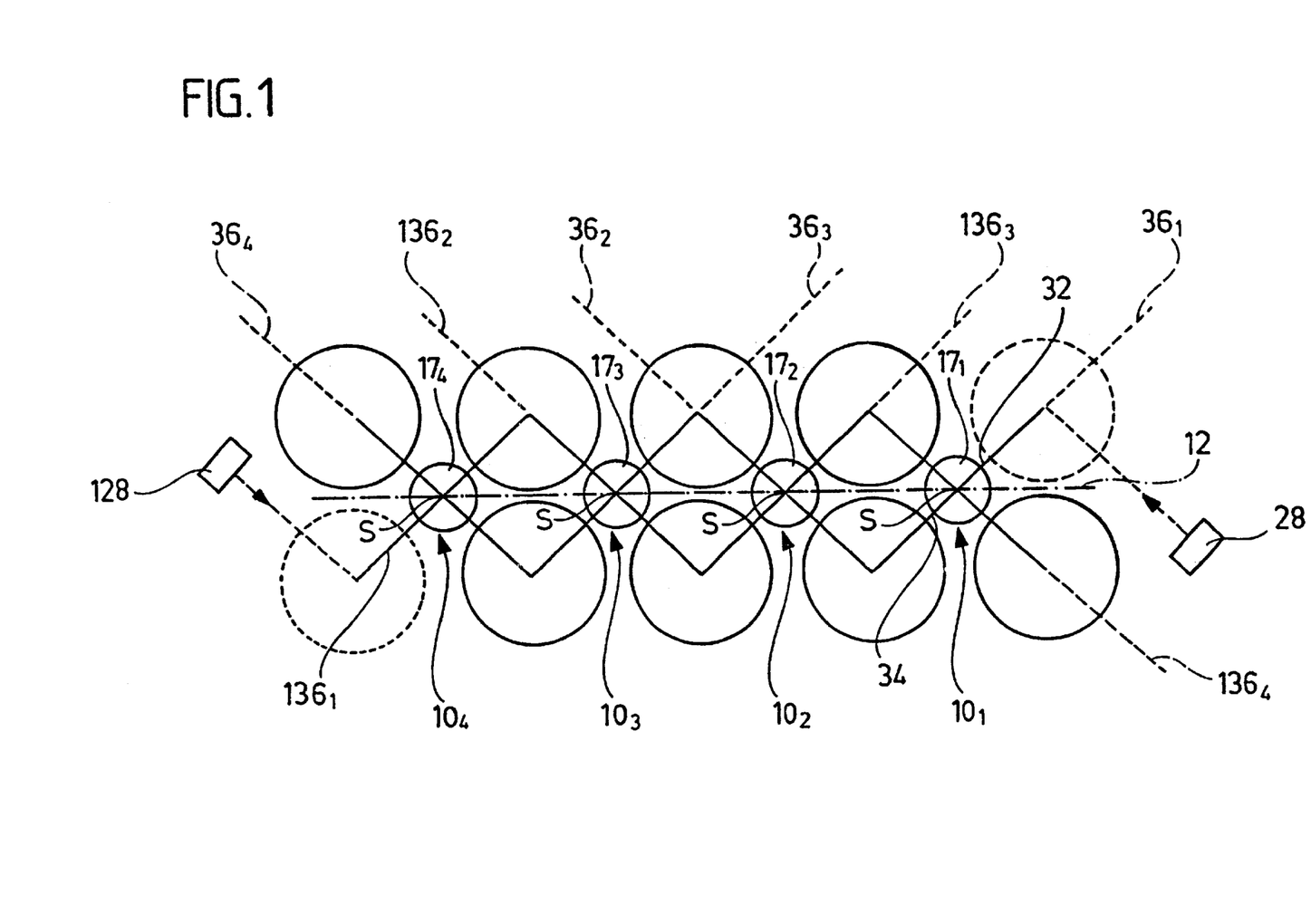
FIG. 1 shows a schematic plan view of an inventive laser amplification system in the direction of arrow A in FIG. 2 with a schematically indicated course of the pumping branches and pumping radiation paths.
Figure 2:
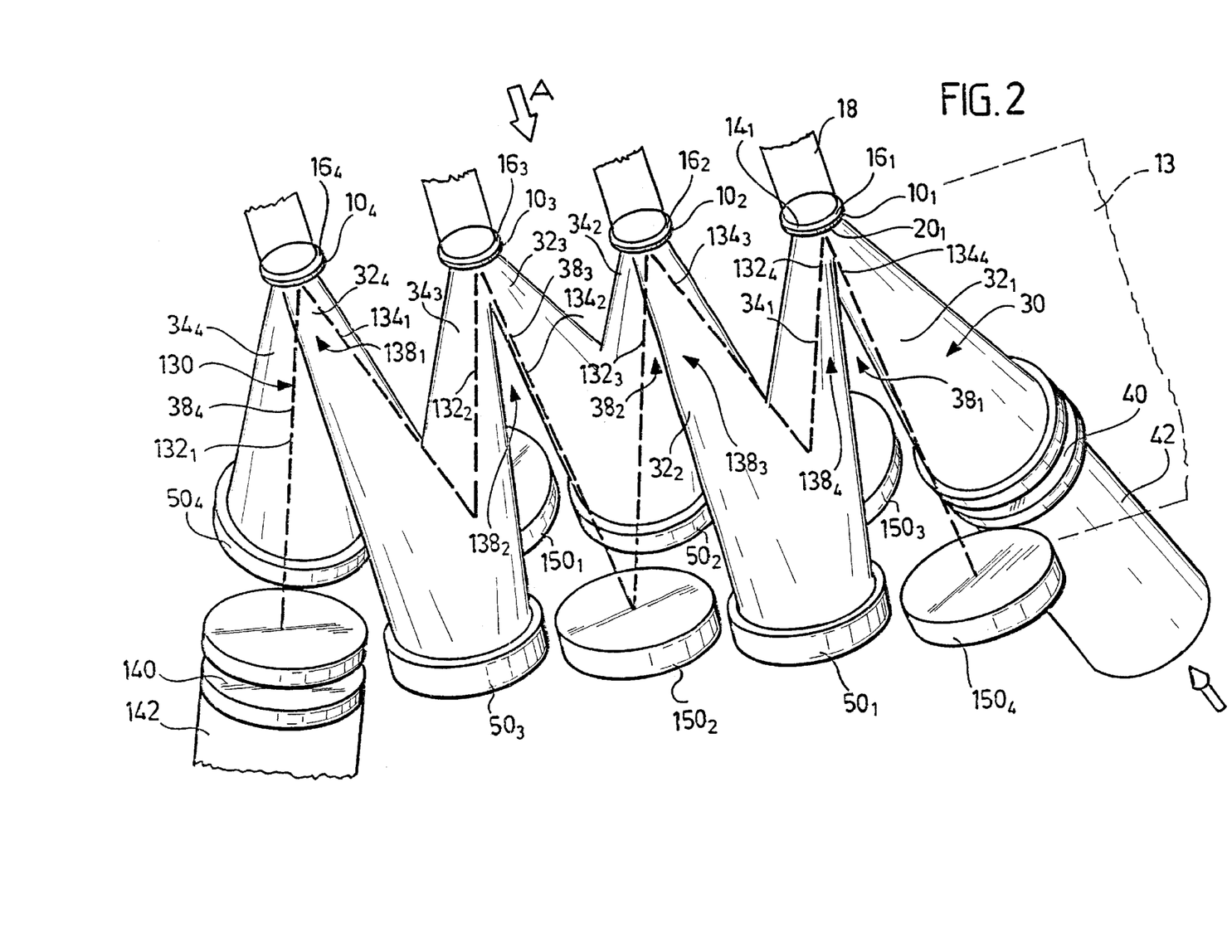
FIG. 2 shows a perspective, schematic illustration of the first embodiment of the inventive laser amplification system illustrated in FIG. 1 with a first pumping radiation path illustrated spatially and a second pumping radiation path illustrated by a dash-dot central line.

A first embodiment of an inventive laser amplification system illustrated in FIGS. 1 and 2 comprises several solid-state bodies 10, in this case the solid-state bodies $10_1$ to $10_4$ which are arranged, for example, along a line 12 which can be not only a straight line but also a curved line. Each of the solid-state bodies 10 has a laser-active medium to be pumped with a pumping radiation field in a solid-state volume area thereof.

Each of the solid-state bodies 10 is designed as a flat disk with two slightly curved or planar flat sides located opposite one another and rests with a rearward flat side 14 on a respective reflector 16 which is arranged, for its part, on a cooling finger 18 so that cooling of the solid-state body 10 is brought about by the cooling finger 18 via the reflector 16.

The pumping radiation field passes, on the one hand, through the front flat side 20 into the solid-state body 10 in order to pump the laser-active medium and, on the other hand, the laser radiation also exits through the front flat side 20, the guidance of the laser radiation not being illustrated in detail in FIGS. 1 and 2 for reasons of clarity.

In accordance with the invention, the reflector 16 is designed such that it reflects at least the pumping radiation field but preferably the laser radiation which is forming as well.

With respect to the type of design of the solid-state body 10 and the type of pumping of the solid-state body 10, the arrangement of the reflector 16 and the cooling finger 18 reference is made in full to EP 0 632 551.

The pumping radiation field 30 forms, as illustrated in FIGS. 1 and 2, a leg $32_1$ of the pumping radiation field 30 which enters the solid-state body $10_1$, is reflected by the reflector 16 after passing through the solid-state body 10 and as outgoing leg $34_1$ penetrates the solid-state body once more from the side of the reflector 16.

The incoming leg $32_1$ and the outgoing leg $34_1$ extend parallel and symmetrically to a plane 36 and form a pumping branch for the first solid-state body $10_1$ designated as a whole as $38_1$.

The incoming leg $32_1$ is preferably focused onto the solid-state body 10, for example, by means of an optical focusing means 40 which focuses an incoming collimated leg 42 of the pumping radiation field 30 onto the desired pumping light spot in the area of the solid-state body 10.

The outgoing leg $34_1$ extends divergently proceeding from the solid-state body 10 and impinges on an optical refocusing means which is designated as a whole as 50 and, in the simplest case as illustrated in FIG. 2, is designed as a refocused mirror, preferably, as a refocused hollow mirror which images the outgoing leg $34_1$ into an incoming leg $32_2$ for the solid-state body $10_2$, from which an outgoing leg $34_2$ then exits again which, for its part, impinges on the optical refocusing means $50_2$ which again images the outgoing leg $34_2$ into an incoming leg $32_3$ which enters the solid-state body $10_3$ and is again reflected by the corresponding reflector $16_3$ and impinges as outgoing leg $34_3$ on a third optical refocusing means 503 which images the outgoing leg $34_3$ into an incoming leg $32_4$ which impinges on the solid-state body $10_4$, is reflected by the reflector $16_4$ thereof and exits from the solid-state body 10 as outgoing leg $34_4$.

The incoming leg $32_2$ and the outgoing leg $34_2$ together form a pumping branch $38_2$ following the pumping branch $38_1$; subsequently, the formation of a further pumping branch $38_3$ is brought about, formed by the incoming leg $32_3$ and the outgoing leg $34_3$, and, finally, the formation of a further pumping branch $38_4$ by the incoming leg $32_4$ and the outgoing leg $34_4$.

All the pumping branches $38_1$ to $38_4$ have the pumping radiation field passing through them one after the other in series, wherein the corresponding planes $36_1$ to $36_4$ each form with one another an angle of $\leq 180°$. For example, in this case, the optical refocusing means $50_1$ to $50_3$ are arranged alternatingly with respect to the line $12$.

With such a row of pumping branches $38_1$ to $38_4$, the laser-active medium in the four solid-state bodies $10_1$ to $10_4$ can be pumped at the same time, wherein the pumping intensity in the laser-active mediums of the individual solid-state bodies $10$ of the row does, however, decrease successively since, for example, the first solid-state body $10_1$ already absorbs part of the intensity of the incoming leg $32_1$ up to the time this impinges on the reflector $16$ and so the outgoing leg $34_1$ already has a smaller intensity at its point of exit on the reflector $16$ and this intensity is decreased further on account of it passing through the solid-state body $10$ again.

Following the first leg $38_1$, the pumping radiation field reduced with respect to its intensity is again focused by the optical refocusing means $50_1$ onto the second solid-state body $10_2$ in the form of the incoming leg $32_2$ onto the solid-state body $10_2$, wherein the intensity of the pumping radiation field again decreases in the second pumping branch $38_2$ as it passes twice through the solid-state body $10_2$ and so at the end of the second pumping branch $38_2$ an intensity for the pumping of the third solid-state body $10_3$ is available which is already reduced due to passing, altogether, four times through a solid-state body $10$, wherein the pumping of the third solid-state body $10_3$ again absorbs intensity on account of passing twice through the solid-state body and, finally, the intensity available in the fourth pumping branch $38_4$ for the pumping of the solid-state body $10_4$ is already reduced on account of passing 6 times through one of the solid-state bodies $10_1$ to $10_4$.

Once the pumping radiation field has passed through all four solid-state bodies $10_4$ with the legs $38_1$ to $38_4$ within the scope of first pumping radiation path, an appreciable intensity still remains, as a rule, in the outgoing leg $34_4$ and so the opportunity presents itself to design the optical refocusing means $50_4$ such that this reverses the course of the light in the first pumping radiation path and reflects the outgoing leg $34_4$ back into itself so that, altogether, the pumping radiation field passes through all the pumping branches $38_4$, $38_3$, $38_2$ and $38_1$ in the reverse order and thus the solid-state bodies $10_4$, $10_3$, $10_2$ and $10_1$ are pumped again in this order.

As a result, the possibility is already created on account of the first pumping radiation path of pumping four solid-state bodies $10_1$ to $10_4$ with four respective passes of the pumping radiation field.

In order, in the case of four solid-state bodies $10_1$ to $10_4$, to have available for the laser-active medium a pumping power density which is of as equal a size as possible in each of the solid-state bodies $10_1$ to $10_4$, a second pumping radiation path is generated in accordance with the invention and this is formed, proceeding from an incoming collimated pumping radiation field $142$, via an optical focusing means $140$ by a pumping radiation field which forms an incoming leg $132_1$ proceeding from the optical focusing means $140$, this leg entering the solid-state body $10_4$ and being reflected by its reflector $16_4$ into the outgoing leg $134_1$. This is reflected by means of an optical refocusing means $150_1$ into an incoming leg $132_2$ which enters the solid-state body $10_3$, is reflected by its reflector $16_3$ in the form of an outgoing leg $134_2$ and impinges on an optical refocusing means $150_2$ which, again, images this into an incoming leg $132_3$ which enters the solid-state body $10_2$, is reflected by its reflector $16_2$ and impinges as outgoing leg $134_3$ on an optical refocusing means $150_3$ which forms an incoming leg $132_4$ which enters the solid-state body $10_1$, is reflected by its reflector $16_1$ and impinges as outgoing leg $134_4$ on an optical refocusing means $150_4$ which is, for example, likewise designed as a mirror reversing the course of the light.

As a result, the second pumping radiation path comprises analogously to the first the pumping branches $138_1$, $138_2$, $138_3$ and $138_4$ which do, however, in their order impinge on the solid-state bodies $10_1$ to $10_4$ with a reverse order to the pumping branches $38_1$ to $38_4$ so that the solid-state body $10_4$ is pumped the most by the second pumping radiation path and the absorbed pumping power successively decreases as far as the solid-state body $10_1$ whereas the first solid-state body $10_1$ is pumped the most by the first pumping radiation path and the absorbed pumping power successively decreases as far as the solid-state body $10_4$.

Furthermore, the pumping branches $138_1$ to $138_4$ are located in planes $136_1$ to $136_4$ which do not coincide with the planes $36_1$ to $36_4$ in the respective area of the respective solid-state body $10_1$ to $10_4$, preferably extend at an angle to one another so that each of the solid-state bodies $10_1$ to $10_4$ is penetrated by two pumping branches located in different planes, namely a first pumping branch $38$ and a second pumping branch $138$, and is pumped in two different directions by a reflected pumping radiation field on account of these planes $36$ and $136$, respectively, extending at an angle to one another, wherein the planes $36$ and $136$ preferably extend transversely to one another in the area of the respective solid-state body $10$, even better at an angle in the order of magnitude of $90°$, in order to bring about a distribution of the pumping radiation field in the respective solid-state body $10_1$ to $10_4$ which is as symmetrical as possible with respect to a point of intersection S of the planes $36$, $136$.

The inventive laser amplification system may be constructed particularly compactly when the reflectors $16_1$ to $16_4$ have reflection surfaces $17_1$ to $17_4$ which extend in a common plane and when a plane of symmetry $13$ extends through the line $12$ and is at right angles to the reflector surfaces $17_1$ to $17_4$ and the optical refocusing means $50_1$ to $50_4$ as well as $150_1$ to $150_4$ are arranged on both sides of the plane $13$. Optical refocusing means located opposite one another in pairs, for example, the optical refocusing means $50_1$ and $150_3$, $150_2$ and $50_2$ as well as $50_3$ and $150_1$, preferably alternate with solid-state bodies $10$ in longitudinal direction of the line $12$, i.e. the solid-state body $10_1$ is followed, when observed along the line $12$, by the pair of optical refocusing means $50_1$ and $150_3$, the solid-state body $10_2$ then follows, then the pair of optical refocusing means $150_2$ and $50_2$, then the solid-state body $10_3$, then the pair of optical refocusing means $50_3$ and $150_1$ and, finally, the solid-state body $10_4$.

In the inventive solution, the lines of intersection of the planes $36$ and $136$ are preferably placed such that they are located as centrally as possible in relation to the solid-state bodies $10_1$ to $10_4$ and the line $12$, along which the solid-state bodies $10_1$ to $10_4$ are arranged, preferably extends through the lines of intersection S of the respective planes $36$ and $136$ in the respective solid-state bodies $10_1$ to $10_4$.

In the first embodiment illustrated in FIGS. 1 and 2, two different pumping radiation sources are, for example, provided for generating the two pumping radiation fields $30$ and $130$. There is, however, also the possibility of dividing the pumping radiation field of one pumping radiation source and of guiding this to the respective optical focusing means 40 and 140 via light guides.

Figure 3:
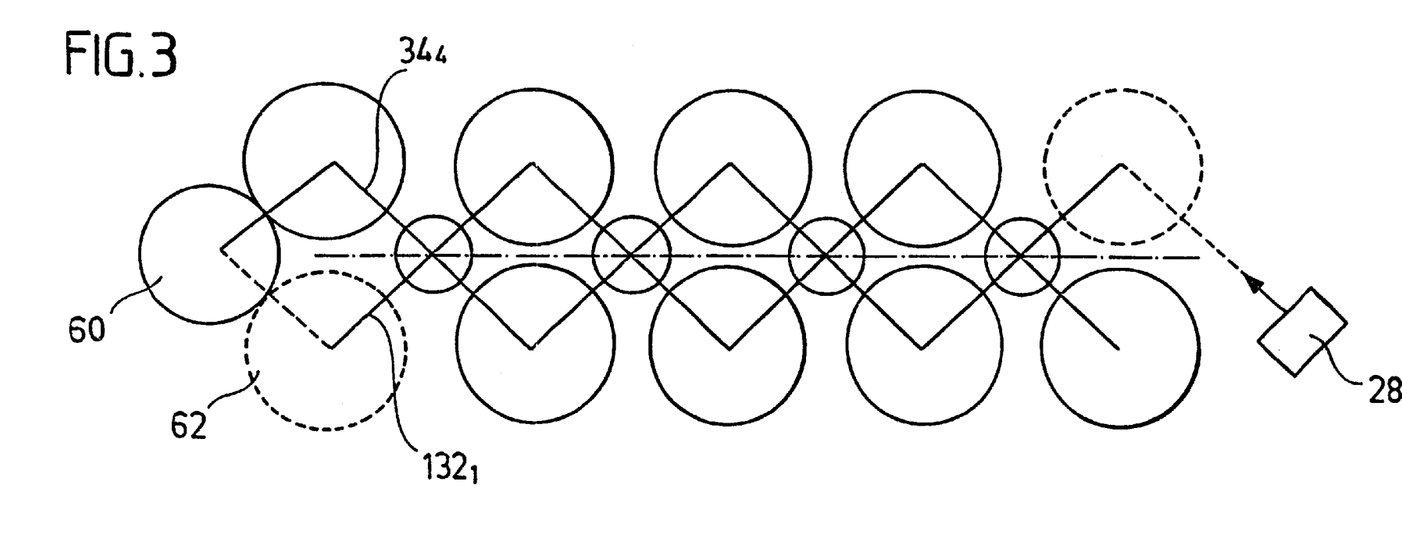
FIG. 3 shows an illustration similar to FIG. 1 of a second embodiment.

In a second embodiment, illustrated in FIG. 3, the optical refocusing means $50_4$ is not designed such that it reflects the outgoing leg $34_4$ back into itself but rather deflects the outgoing leg $34_4$ onto a deflection mirror 60 which images this onto an optical refocusing means 62 again which replaces the optical focusing means 140 and again forms the incoming leg $132_1$ which is, in the long run, formed from the outgoing leg $34_4$ due to deflection by the optical deflection means 60 and the optical refocusing means 62.

As for the rest, the second embodiment is identical to the first and so reference can be made in full to the explanations hereto.

In this embodiment, the second pumping branches $138_1$ to $138_4$ do, however, each have a smaller intensity than the first pumping branches $38_1$ to $38_4$ since the initial intensity of the incoming leg in the second pumping radiation path with the pumping branches $138_1$ to $138_4$ corresponds to the final intensity of the outgoing leg $34_4$ of the first pumping light path with the pumping branches $38_1$ to $38_4$.

Nevertheless, a pumping of each of the solid-state bodies $10_1$ to $10_4$ can be brought about in the second embodiment according to FIG. 3 in the two planes 36 and 136 extending transversely to one another.

Figure 4:
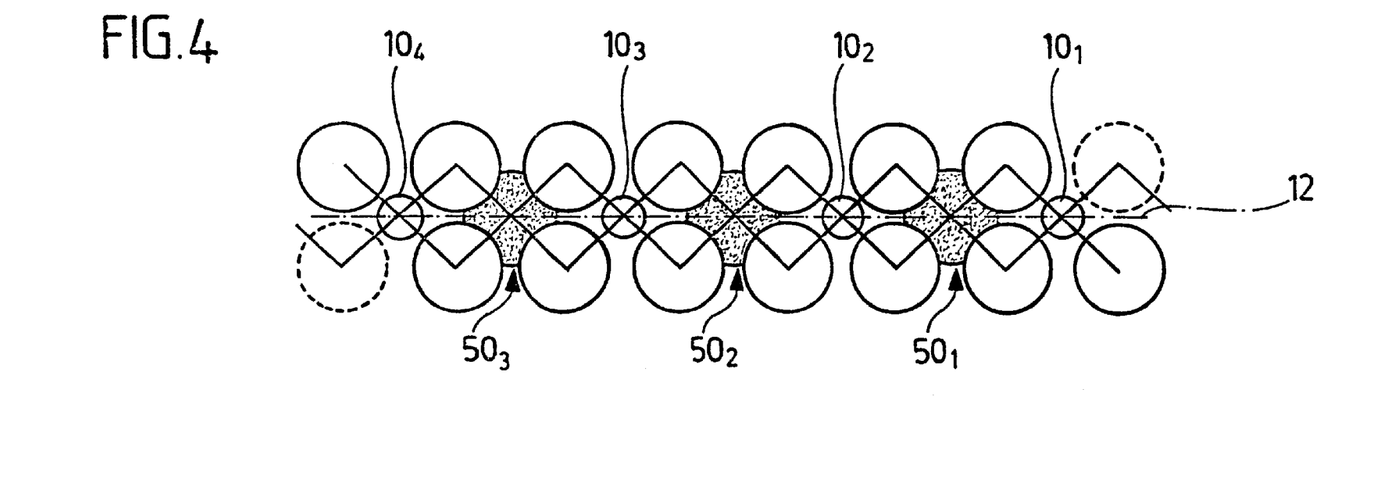
FIG. 4 shows an illustration similar to FIG. 1 of a third embodiment with intermediately collimating refocusing elements.
Figure 5:
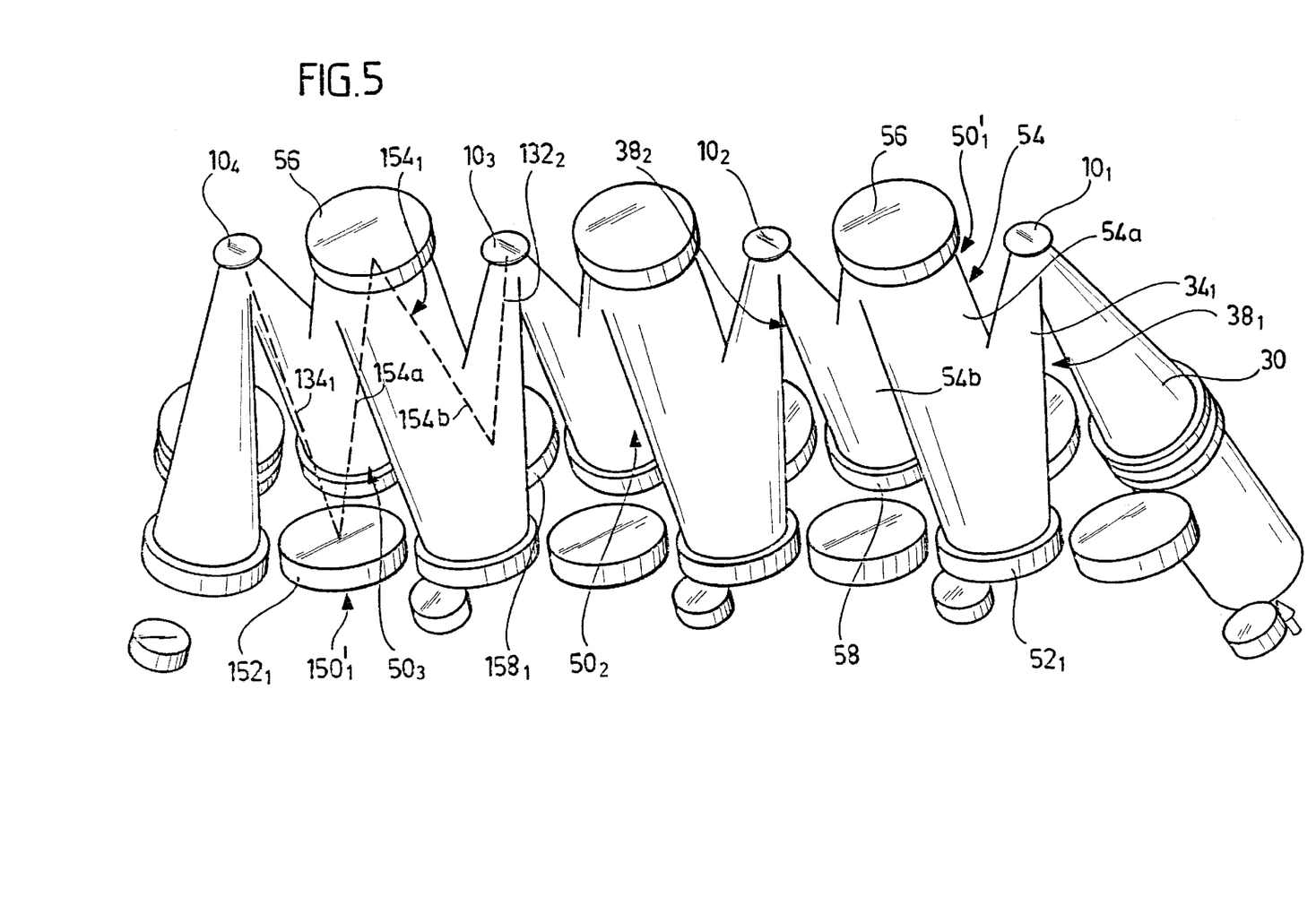
FIG. 5 shows a schematic perspective illustration of the third embodiment according to FIG. 4 with a first pumping radiation path drawn in in full and a second pumping radiation path indicated by dash-dot central lines.
Figure 6:
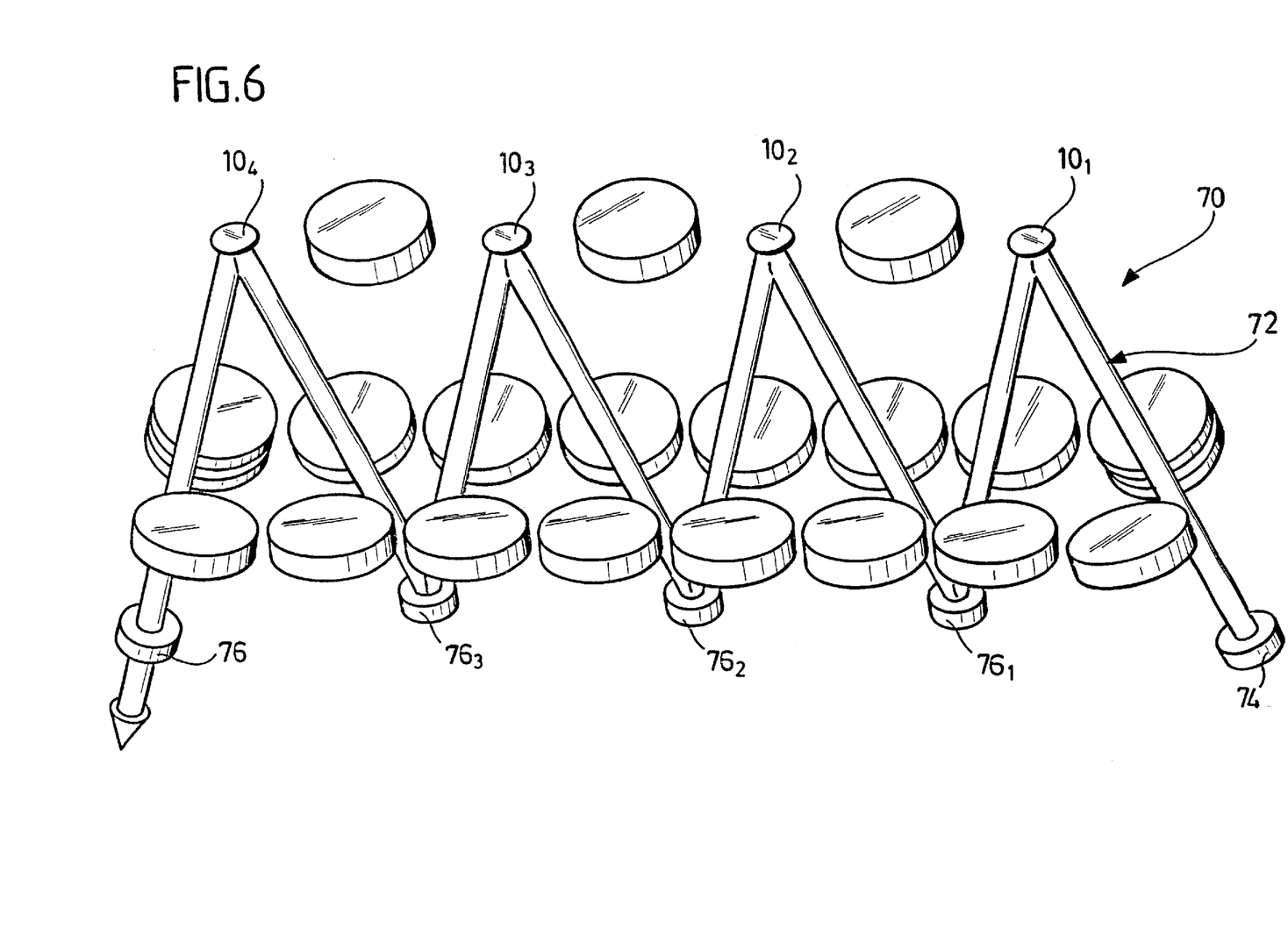
FIG. 6 shows a schematic perspective illustration of a laser resonator of the third embodiment without illustration of the pumping radiation field and FIG. 7 shows a schematic illustration similar to FIG. 1 of a fourth embodiment of the inventive solution.

In a third embodiment of an inventive laser amplification system, illustrated in FIGS. 4 to 6, the solid-state bodies $10_1$ to $10_4$ are likewise arranged along the line 12.

In contrast to the first embodiment and to the second embodiment each of the optical refocusing means $50_1$ to $50_3$ comprises not only no hollow mirror which images the outgoing leg $34_1$ of the first pumping branch $38_1$ onto the incoming leg $32_2$ of the second pumping branch $38_2$ but rather a collimating element $52_1$ which images the outgoing leg $34_1$ into a first partial leg 54a of a collimated leg 54, an optical deflection means 56 which images the first collimated partial leg 54a into a second collimated partial leg 54b and an optical focusing means 58 which images the second collimated partial leg 54b into the incoming leg $32_2$.

The optical refocusing means $50_2$ and $50_3$ are designed in the same way.

In this respect, the principle is maintained in the same way as in the first embodiment that the respective solid-state bodies $10_1$ to $10_4$ are penetrated by a first pumping branch $38_1$ to $38_4$ of the first pumping radiation path of the pumping radiation field 30.

The optical refocusing means $150_1$ to $150_3$ also collimate the outgoing leg $134_1$ by means of a collimating element $152_1$ which forms a partial leg 154a of a collimated leg $154_1$ which is imaged via the deflection element 56 into the second partial leg 154 of each collimated leg $154_1$ and impinges on the focusing element $158_1$ which images the second partial leg 154b into the incoming leg $132_2$ which enters the solid-state body $10_3$.

The remaining optical refocusing means $150_2$ and $150_3$ are designed in the same way.

Furthermore, a resonator designated as a whole as 70 is provided in the third embodiment, as illustrated in FIG. 6, and its resonator radiation field 72 penetrates all the solid-state bodies $10_1$ to $10_4$. The resonator 70 has two end mirrors 74 and 76 for forming the resonator radiation field 72 and deflection mirrors $76_1$ to $76_3$ arranged, in addition, between the solid-state bodies $10_1$ to $10_4$ while, in addition, the reflectors $16_1$ to $16_4$ associated with the individual solid-state bodies $10_1$ to $10_4$ are likewise effective at the same time as deflection mirrors of the resonator 70 and also reflect the resonator radiation field 72 so that this extends, for example, from the end mirror 74 to the reflector $16_1$, from this to the deflection mirror $76_1$, from this to the reflector $16_2$, from this to the deflection mirror $76_2$, from this to the reflector $16_3$, from this to the deflection mirror $76_3$ and from this to the reflector $16_4$ and then to the end mirror 76.

The resonator for the resonator radiation field need not, however, be automatically designed, as illustrated in FIG. 6, such that it comprises all the solid-state bodies. It is likewise conceivable to associate a separate resonator with each solid-state body and then use the laser radiation fields exiting from the respective resonators either individually for separate tasks or superimpose them.

Figure 7:
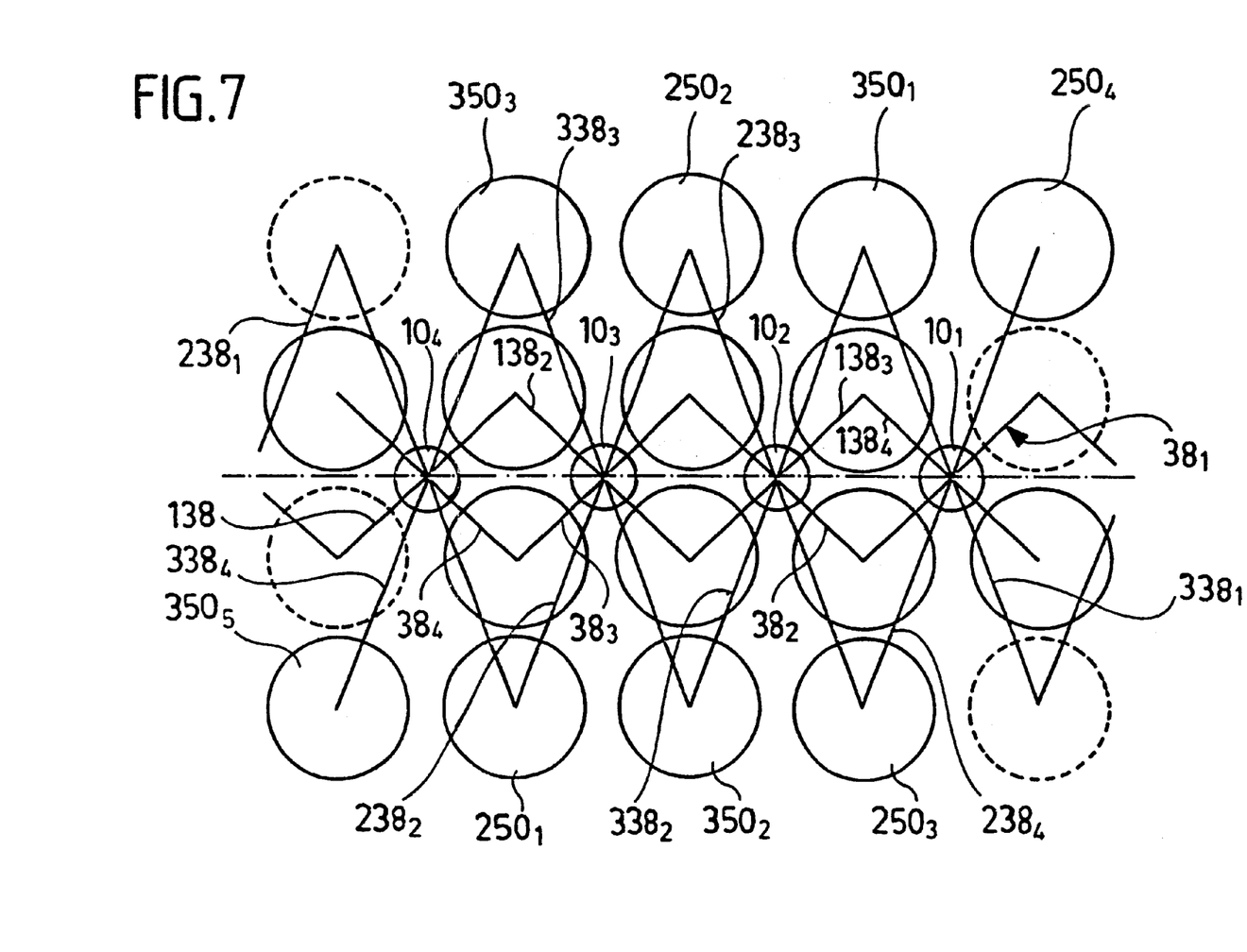

A fourth embodiment of an inventive laser amplification system, illustrated merely schematically in FIG. 7, is based on the first embodiment, wherein the individual solid-state bodies $10_1$ to $10_4$ are, however, penetrated not only by the first pumping radiation path with the first pumping branches $38_1$, $38_2$, $38_3$ and $38_4$ and, in addition, with the pumping branches $138_1$, $138_2$, $138_3$ and $138_4$ of the second pumping radiation path but, in addition, a third pumping radiation path and a fourth pumping radiation path are provided, wherein the fourth pumping radiation path is formed by additional optical refocusing means $250_1$, $250_2$, $250_3$ and $250_4$, between which the third pumping branches $238_1$, $238_2$, $238_3$ and $238_4$ extend. Optical refocusing means $350_1$, $350_2$, $350_3$, $350_4$ are also provided for the fourth pumping radiation path and these image the pumping branches $338_1$, $338_2$, $338_3$ and $338_4$ into one another. As for the rest, the fourth embodiment is constructed, in principle, in the same way and operates in the same way as the first embodiment and so the entire explanations concerning the first embodiment with respect to the planes, in which the pumping branches 38, 138, 238 and 338 are located, also apply for the fourth embodiment.

The advantage of the fourth embodiment is that the possibility is created of pumping the respective solid-state body $10_1$ to $10_4$ even more uniformly with the pumping radiation field.

The present disclosure relates to the subject matter disclosed in International Application No. PCT/EP99/05128 (WO 00/08726) of Jul. 19, 1999, the entire specification of which is incorporated herein by reference.

What is claimed is:

1. A laser amplification system comprising:
   several solid-state volumes having a laser-active medium,
   a pumping radiation source for generating a pumping radiation field for the optical pumping of the laser-active medium,
   a pumping radiation reflector associated with each solid-state volume, said reflector allowing an incoming leg of the pumping radiation field entering the solid-state volume to pass through the solid-state volume again as an outgoing leg,
   the incoming leg and the outgoing leg forming an angle with one another located in a first plane and forming a first pumping branch for each solid state volume,
   a first pumping radiation path through the solid-state volumes,
   the first pumping branches of the solid-state volumes being arranged in said path so as to follow one another such that the pumping radiation field passes through the several solid-state volumes in a first sequence,
   wherein:
   each solid-state volume is penetrated by a second pumping branch, the incoming leg and the outgoing leg of said second pumping branch being located and forming an angle in a second plane different from the first plane, a second pumping radiation path is provided, and the second pumping branches of the several solid-state volumes are arranged in said second pumping radiation path so as to follow one another such that the pumping radiation field passes through the solid-state volumes in a second sequence.

2. A laser amplification system as defined in claim 1, wherein in the second sequence the order of the solid-state volumes is changed in relation to the first sequence.

3. A laser amplification system as defined in claim 1, wherein each of the pumping radiation paths is supplied by its own pumping radiation source.

4. A laser amplification system as defined in claim 1, wherein the pumping radiation paths are supplied by a single pumping radiation source.

5. A laser amplification system as defined in claim 4, wherein the pumping radiation paths are coupled to one another by an optical deflection means.

6. A laser amplification system as defined in claim 1, wherein the pumping radiation field passes through each pumping radiation path in two opposite directions.

7. A laser amplification system as defined in claim 6, wherein a reflector is associated at one end of each pumping radiation path for reflecting back the pumping radiation field.

8. A laser amplification system as defined in claim 1, wherein in the second sequence the order of the solid-state volumes is reversed in relation to the first sequence.

9. A laser amplification system as defined in claim 1, wherein at least one additional pumping radiation path is provided, the pumping radiation field passing through the solid-state volumes with said path in the form of at least one additional sequence.

10. A laser amplification system as defined in claim 9, wherein the at least one additional sequence runs in a manner that counteracts varying pumping excitations of the laser active material in the solid-state volume as a result of the first and the second sequences.

11. A laser amplification system as defined in claim 1, wherein the individual pumping branches of a pumping radiation path are coupled by optical refocusing means.

12. A laser amplification system as defined in claim 11, wherein the optical refocusing means reshape the outgoing leg of a pumping branch directly into the corresponding one of the incoming legs of the next pumping branch.

13. A laser amplification system as defined in claim 11, wherein at least one of the optical refocusing means comprises an intermediately collimating optical refocusing means and reshapes the respective outgoing leg via an intermediately collimated leg into the corresponding incoming leg.

14. A laser amplification system as defined in claim 13, wherein the intermediately collimating optical refocusing means have a folded, collimated leg.

15. A laser amplification system as defined in claim 14, wherein the intermediately collimating optical refocusing means have a deflection element for folding the intermediately collimated leg.

16. A laser amplification system as defined in claim 15, wherein one of the optical refocusing means of each of the first and second pumping radiation paths each image the respective intermediately collimated leg onto a common deflection element.

17. A laser amplification system as defined in claim 13, wherein the intermediately collimating optical refocusing means have a collimating element reshaping the respectively outgoing leg into the intermediately collimated leg.

18. A laser amplification system as defined in claim 13, wherein the intermediately collimating optical refocusing means have a focusing element imaging the intermediately collimated leg into the respectively incoming leg.

19. A laser amplification system as defined in claim 11, wherein the optical refocusing means comprise hollow mirrors.

20. A laser amplification system as defined in claim 19, wherein the hollow mirrors are non-spherical mirrors.

21. A laser amplification system as defined in claim 20, wherein the hollow mirrors are elliptical mirrors.

22. A laser amplification system as defined in claim 20, wherein the hollow mirrors are parabolic mirrors.

23. A laser amplification system as defined in claim 20, wherein the hollow mirrors are toric mirrors.

24. A laser amplification system as defined in claim 1, wherein the solid-state volumes are arranged along a line.

25. A laser amplification system as defined in claim 1, wherein all the reflection surfaces of the reflectors associated with the solid-state volumes are located in a common plane.

26. A laser amplification system as defined in claim 25, wherein the refocusing elements are located on different sides of a surface extending at right angles to the reflection surfaces and through a line along which the solid-state volumes are arranged.

27. A laser amplification system as defined in claim 1, wherein the planes where the first and second pumping branches are located intersect at an angle of smaller than or equal to 90°.

28. A laser amplification system as defined in claim 1, wherein the planes where the first and second pumping branches are located extend transversely to one another.

29. A laser amplification system as defined in claim 1, wherein the several solid-state volumes having laser-active medium are arranged in several solid-state bodies.

30. A laser amplification system as defined in claim 29, wherein each solid-state volume having laser-active medium is arranged in its own solid-state body.

\* \* \* \* \*